(12) United States Patent
Mills et al.

(10) Patent No.: US 9,284,226 B2
(45) Date of Patent: Mar. 15, 2016

(54) CEMENTITIOUS COMPOSITIONS

(75) Inventors: Peter Shelley Mills, Stamping Ground, KY (US); Thomas L. Robl, Sadieville, KY (US); Robert F. Rathbone, Midway, KY (US); Robert Benjamin Jewell, Lexington, KY (US)

(73) Assignees: MINOVA INTERNATIONAL LIMITED, Chesterfield (GB); UNIVERSITY OF KENTUCKY, Lexington, KY (US)

( * ) Notice: Subject to any disclaimer, the term of this patent is extended or adjusted under 35 U.S.C. 154(b) by 0 days.

(21) Appl. No.: 12/963,179

(22) Filed: Dec. 8, 2010

(65) Prior Publication Data

US 2012/0145044 A1 Jun. 14, 2012

(51) Int. Cl.
| | | |
|---|---|---|
| *C04B 7/32* | (2006.01) | |
| *C04B 11/30* | (2006.01) | |
| *C04B 28/06* | (2006.01) | |
| *C04B 28/14* | (2006.01) | |
| *C04B 111/00* | (2006.01) | |
| *C04B 111/72* | (2006.01) | |

(52) U.S. Cl.
CPC .............. *C04B 28/065* (2013.01); *C04B 7/323* (2013.01); *C04B 28/14* (2013.01); *C04B 11/30* (2013.01); *C04B 2111/00155* (2013.01); *C04B 2111/00577* (2013.01); *C04B 2111/00724* (2013.01); *C04B 2111/72* (2013.01); *C04B 2201/05* (2013.01)

(58) Field of Classification Search
CPC .... C04B 2103/10; C04B 14/365; C04B 7/323
USPC .......................................... 106/690, 692, 695
See application file for complete search history.

(56) References Cited

U.S. PATENT DOCUMENTS

| | | | | |
|---|---|---|---|---|
| 4,488,909 A | * | 12/1984 | Galer et al. ..................... 106/695 |
| 4,798,628 A | * | 1/1989 | Mills et al. ..................... 106/692 |
| 4,957,556 A | * | 9/1990 | Kunbargi ....................... 106/693 |
| 6,113,864 A | * | 9/2000 | Kueper et al. .................. 422/180 |
| 6,437,027 B1 | * | 8/2002 | Isomura et al. .................. 524/5 |
| 2002/0157576 A1 | | 10/2002 | Mills et al. |
| 2002/0161071 A1 | * | 10/2002 | Mills et al. ........................ 524/2 |
| 2006/0118006 A1 | | 6/2006 | Amathieu et al. |
| 2009/0105099 A1 | * | 4/2009 | Warrender et al. ........... 507/269 |
| 2009/0156878 A1 | * | 6/2009 | Cau Dit Coumes .... C04B 14/06 588/3 |

FOREIGN PATENT DOCUMENTS

WO    WO 97/45379    12/1997

OTHER PUBLICATIONS

Cement and Concrete Basics."Concrete in the Classroom". Retrieved on Nov. 14, 2011.Retrieved from http://www.cement.org/basics/concretebasics_lessonfive.asp.*
International Search Report for corresponding application PCT/GB2011/052417 mailed Apr. 5, 2012.
Written Opinion for corresponding application PCT/GB2011/052417 mailed Apr. 5, 2012.
Sato et al, "Setting accelerators for shotcrete," XP 000191084, Chemical Database Accession No. 113-217052, Abstract, 1990.
Sato et al, "Rapid-setting agents for mortar and cement," XP 000057497, Chemical Abstracts Service, vol. 110, No. 7, p. 354, 1989.
Matusinović et al, Schnell bindende and frühhochfeste Calciumaluminatzemente/Rapid setting and hardening calcium aluminate cement materials, XP-001241310, vol. 58, No. 5, pp. 72-79, 2005.
ASTM International, Designation: C191-08, "Standard Test Methods for Time of Setting of Hydraulic Cement by Vicat Needle," American Association State Highway and Transportation Officials Standard, AASHTO No. T131, pp. 1-8, Published Jul. 2008, USA.

* cited by examiner

*Primary Examiner* — Jun Li
*Assistant Examiner* — Karam Hijji
(74) *Attorney, Agent, or Firm* — Nixon & Vanderhye P.C.

(57) ABSTRACT

The invention provides a cementitious composition comprising a cement component comprising (i) an accelerant, (ii) a calcium sulphate source and (iii) an ettringite forming cement; an aggregate; and optionally water; wherein the cement has a minimum unconfined compressive strength of 1500 psi when tested in accordance with ASTM C1140 and/or C1604 at 15 minutes after placement; methods for its use and concrete formed from it.

14 Claims, No Drawings

CEMENTITIOUS COMPOSITIONS

The present invention provides a cementitious composition, a method of applying the composition, a method of forming a support member and concrete formed from the composition.

Due to the current concerns about terrorist attacks on municipal structures, there has been a desire to solve the problem that known cementitious systems do not have a sufficiently high early cure strength that they are suitable to be deployed with an early response team to rapidly stabilize a blast damaged structure. A system is needed that will provide the capability of quickly stabilizing a structure such as an airport runway, a tunnel, bridge and/or a dam that has been shocked and/or damaged by explosives before it fails catastrophically.

In mining applications, there is a desire to solve the problem of how to reduce the time spent preparing excavations, shafts or tunnels to increase the productivity of a worker in such a structure without jeopardizing their safety.

A way of ameliorating these problems has been sought.

According to the invention there is provided a cementitious composition comprising a cement component comprising (i) an accelerant, (ii) a calcium sulphate source and (iii) an ettringite forming cement; an aggregate; and optionally water; wherein the cement has a minimum unconfined compressive strength of 1500 psi when tested in accordance with ASTM C1140 and/or C1604 at 15 minutes after placement.

According to the invention there is also provided a first method of applying the composition according to the invention to a surface which method comprises the steps of (i) providing the composition; and (ii) applying the composition to the surface; wherein the composition comprises water.

According to the invention there is also provided a second method of applying the composition according to the invention to a surface which method comprises the steps of (i) providing the composition; (ii) mixing the composition with water; and (ii) applying the mixed composition to the surface.

According to the invention there is further provided a method of forming a concrete member which method comprises the step of spraying the composition according to the invention to form the member.

According to the invention there is also provided concrete comprising the composition according to the invention.

The composition according to the invention may be in the form of gunite or shotcrete. The term "shotcrete" refers to a cement composition which contains water which is applied by being sprayed at a location. Generally the water-containing cement composition is prepared and then pumped to a nozzle where compressed air is introduced in a manner designed to project the composition on to a substrate at the location. The term "gunite" refers to a dry cement composition which is applied by being sprayed at a location. Generally the dry cement composition is blown down a hose or pipe to a nozzle where water is introduced and the damp (or wet) mixture is projected by compressed air on to a substrate at the location.

Gunite or shotcrete is generally known for use in providing temporary support in open excavations, shaft sinking and tunneling. They are typically sprayed on to support exposed ground until permanent support can be installed. Permanent support can be in the form of concrete segmental linings, steel supports, rock bolts, additional thickness of shotcrete or gunite and combinations of one or more of these support types or other techniques known to those skilled in the art.

In open excavations, when a lift is removed and as the newly exposed ground has limited stand up time, shotcrete or gunite is sprayed on first for stabilisation and then soil nails or some other means of support is installed for permanent support. In shaft sinking as a round is mucked out and before a ring can be installed often a shotcrete or gunite coating is applied for support. In tunneling, the exposed face is often sprayed with shotcrete or gunite until the next round is prepared for blasting. In addition the tunnel surface is often sprayed with shotcrete or gunite until roof bolts or steel rings or concrete segmental linings can be installed. Shotcrete and gunite are well proven materials which have been used successfully for many years for the temporary stabilisation of rock surfaces.

Conventional shotcrete or gunite is based on Portland cement with or without admixtures. The admixtures used in conventional shotcrete or gunite may be accelerators, retarders, anti-rebound agents and other materials known to those skilled in the art. Conventional shotcrete or gunite can set in only a few minutes, but they are relatively slow to harden taking 28 days to attain most of their strength. Even at one day they will only possess about 1500 psi unconfined compressive strength. This means there is a significant delay after the gunite or shotcrete has been sprayed whilst it hardens until it is safe to resume mining activities in the vicinity of the shotcrete or gunite. This delay depends on what is considered to be an acceptable strength the concrete needs to attain. This will depend on site conditions but is likely to be a day or more. This time delay slows down mining operations and limits the applications in which shotcrete or gunite may be used.

It has surprisingly been found that the composition according to the invention achieves a minimum unconfined compressive strength of 1500 psi when tested in accordance with ASTM C1604, C39 and/or C1140 at 15 mins after placement. In mining or tunneling applications, this short hardening time would be considered instantaneous because there is a small but finite length of time needed to remove the spray equipment from the application site and reintroduce mining or tunneling activities. As the composition according to the invention is effectively an instantaneously curing structural coating, it will have applications outside of mining and tunneling. One application is the temporary stabilisation of structures damaged by earthquakes, unauthorised explosive devices etc. The composition according to the invention may be applied as a coating to the damaged structure in such a way as to render it stable until a permanent repair can be effected or the structure demolished in a controlled manner. The composition according to the invention may also be used to form a structural support member in situ by spraying the gunite or shotcrete so as to form a supportive member such as a beam or a pilaster.

The term "ettringite forming cement" refers to a cement which is capable of forming ettringite. The term "ettringite" refers to a calcium trisulphoaluminate having molecules of water of crystallisation and which has the formula $3CaO.Al_2O_3.3CaSO_4.32H_2O$. Ettringite is produced by the hydration of cementitious compositions containing calcium aluminate and calcium sulphate. British Patent No. 1506417 describes the use of a composition containing Portland cement, aluminous cement and calcium sulphate. The contents of GB 1 506 417 are incorporated herein in their entirety by reference. In the composition of British Patent No. 1506417, the aluminous cement is mainly $CaO.Al_2O_3$ and $CaO.2Al_2O_3$ together with at least 15% by weight $12CaO.7Al_2O_3$ and the calcium sulphate may be any of the available forms of calcium sulphate such as a dihydrate, a hemihydrate or an anhydrite.

Ettringite may be formed by a cementitious composition comprising Klein's compound which is $C_4A_3S^*$ wherein C represents CaO, A represents $Al_2O_3$ and S* represents $SO_3$. Therefore, in some embodiments, the ettringite forming cement comprises $C_4A_3S^*$ or a mixture of cement components which form $C_4A_3S^*$ in use. In some embodiments, the ettringite forming cement may also be provided by a mixture of a high alumina cement and calcium sulphate or by a cement as described in U.S. Pat. No. 7,150,786 to Kunbargi, the contents of which document are incorporated herein in their entirety.

In some embodiments, the ettringite forming cement may be a cement marketed as Qwix® (by Buzzi Unicem USA Inc.) as a mineral additive for use with Portland cement concrete. An analysis of the ingredients of Qwix® is given in Example 1. Qwix® is regarded as a hydraulic cementitious material per ASTM C219. Surprisingly, it has been found that Qwix® is useful without the presence of Portland cement.

The ettringite forming cement may be present in an amount from 20% by weight, for example from 30% by weight preferably to 80% by weight, for example to 60% by weight, for example to 50% by weight.

The term "high alumina cement" refers to a cement which is also known as calcium aluminate cement and may be a cement which when compared to a Portland cement has a relatively high alumina content in which the alumina is present as a reactive calcium aluminate and/or as a reactive calcium sulphoaluminate and/or as an amorphous glass form. A person of skill in the art would be able to determine a suitable high alumina cement depending upon the other components of the cement composition. The high alumina cement may be provided by a high alumina cement, sometimes referred to as Ciment Fondu which normally contains about 40 to 80% by weight of calcium aluminate phases (or 40 to 50% of calcium aluminate (CA)).

In some embodiments, the high alumina cement may have a C:A (calcium oxide (CaO) to aluminate ($Al_2O_3$)) molar ratio of greater than 1:1. For example the high alumina cement may comprise $C_4AF$ (tetracalcium alumino ferrite $((CaO)_4.Al_2O_3.Fe_2O_3)$ and $C_{12}A_7$ $((CaO)_{12}.(Al_2O_3)_7)$.

The term "calcium aluminate" refers to any aluminate-containing cement such as CA, $CA_2$, $C_3A$, $C_{12}A_7$, $C_4AF$ and $C_{11}A_7.CaF_2$, calcium sulphoaluminate and calcium ferroaluminate and analogues thereof; wherein C represents CaO and A represents $Al_2O_3$. A person of skill in the art would be able to determine a suitable calcium aluminate depending upon the other components of the cement composition.

The term "calcium sulphate source" refers to any source of calcium sulphate which is suitable for forming a cementitious composition. A person of skill in the art would be able to determine a suitable source of calcium sulphate. For example a suitable calcium sulphate source includes beta anhydrite, gypsum or hemi-hydrate; typically beta anhydrite is used optionally in combination with gypsum and/or hemi-hydrate. In some embodiments, the calcium sulphate source may be present in an amount from about 1% by weight, preferably from about 2% by weight preferably to about 70% by weight, preferably to about 60% by weight, more preferably to about 50% by weight.

The term "calcium sulphoaluminate" refers to pure calcium sulphoaluminate which is of the formula $C_4A_3S^*$ where C and A are as defined above and S* represents $SO_3$. This is sometimes known as Klein's compound and may also be written as $3CaO.3Al_2O_3.CaSO_4$.

In some embodiments, the cement composition may be provided as a two part cement composition wherein the first part comprises the ettringite forming cement, calcium sulphate source, optionally a suspension agent, optionally a retarding agent and optionally water and the second part comprises the accelerant and water.

The term "accelerant" refers to an agent which accelerates the cure of the cement composition, for example which is capable of assisting the nucleation of ettringite. In some embodiments, the accelerant may be a crystal nucleation agent. In some embodiments, the accelerant may be a lithium salt, for example lithium carbonate ($Li_2CO_3$), a lithium halide (for example $LiCl_2$) or such other suitable lithium salt known to a person of skill in the art. The accelerant may be present in an amount from about 0.01% by weight to about 5% by weight.

In some embodiments, the cement component may comprise (i) an accelerant, (ii) a calcium sulphate source and (iii) an ettringite forming cement, optionally (iv) water and (v) one or more of the additional ingredients such as:
  (a) a suspension agent;
  (b) a retarding agent
  (c) an anti-rebound agent;
  (d) a stabilizing agent; and/or
  (e) an additive.

In some embodiments, the cement composition may consist essentially of a cement component consisting essentially of (i) an accelerant, (ii) a calcium sulphate source and (iii) an ettringite forming cement, optionally (iv) water and (v) one or more of the additional ingredients; an aggregate; and optionally water. In some embodiments, the cement composition may consist of a cement component consisting of (i) an accelerant, (ii) a calcium sulphate source and (iii) an ettringite forming cement, optionally (iv) water and (v) one or more of the additional ingredients; an aggregate; and optionally water. In some embodiments, the cement composition may be substantially free from, for example free from Portland cement.

The term "% by weight" for an ingredient of the cement composition refers to a percentage by weight of the total solids content of the cement component.

The term "suspension agent" refers to any agent which is capable of suspending a powdered non-soluble ingredient of the cement component in water; in other words, the suspension agent reduces the settling out of a powdered non-soluble ingredient of the cement component when it is added to water. A person of skill in the art would be able to determine a suitable suspension agent depending on the other components of the cement composition. For example, the suspending agent may be a cellulose ether; a polymer such as a polyacrylamide, polyethylene oxide and/or a polyacrylate; a gum such as an anionic polysaccharide (e.g. Welan gum), guar gum, xanthan gum and/or gum acacia; starch, hectorite, bentonite, finely divided amorphous silica and/or attapulgite. In some embodiments, the suspension agent may be present in an amount from 0.1% by weight, preferably from 0.2% by weight, preferably to 25% by weight, more preferably to 15% by weight, more preferably to 10% by weight.

The term "retarding agent" refers to any agent which is capable of slowing the rate of curing of the cement component. A person of skill in the art would be able to determine a suitable retarding agent depending upon the other components of the cement composition. For example, the retarding agent may be a polysaccharide, carboxylic acid, carboxylic acid salt (such as sodium gluconate), glucose, fructose, lactose and/or sucrose. In some embodiments, the retarding agent may be present in an amount from 0.1% by weight, preferably from 0.2% by weight, preferably to 10% by weight, more preferably to 5% by weight.

The term "stabilizing agent" refers to an agent which helps increase the long term strength of the concrete formed from the composition according to the invention. In some applications of the invention, long term strength may be required. A suitable stabilizing agent is a reactive silica source. The term "reactive silica source" refers to any source of reactive silica which is suitable for forming a cementitious composition. A person of skill in the art would be able to determine a suitable reactive silica source. For example a suitable reactive silica source includes a ground granulated blast furnace slag (GG-BFS), a pozzolan, pulverised flyash, silica fume or other glassy mixtures of lime and silica; typically GGBFS is used optionally in combination with a pozzolan, pulverised flyash, silica fume or other glassy mixtures of lime and silica. In some embodiments, the reactive silica source may be present in an amount from 1% by weight, preferably from 5% by weight, more preferably from 10% by weight preferably to 70% by weight, preferably to 60% by weight, more preferably to 50% by weight.

The term "pozzolan" refers to a siliceous ash which may be a non-aluminous cement. A person of skill in the art would be able to determine a suitable pozzolan depending upon the other components of the cement composition. For example the pozzolan may be a blast furnace slag, flyash (for example class C or class F flyash), a reactive clay (such as metakaolin) and/or silica fume.

The term "anti-rebound agent" refers to any agent which is capable of increasing the cohesion of the cement composition such that the aggregate is integrated with the cement composition such that it does not separate when the cement composition is sprayed; or to an agent which provides a substantially instantaneous gel or set to the composition (for example an alkali metal silicate or aluminate; a polyacrylamide; a cellulose ether; aluminium sulphate; microfine silica etc.). A skilled person would be able to determine a suitable anti-rebound agent depending upon the intended use of the cementitious composition and/or the other additives of the composition.

The term "additive" refers to any further additive required for the correct functioning of the cement composition. A person of skill in the art would be able to determine a suitable additive depending upon the other components of the cement composition. For example, the additive may be an anti wash-out retarder (e.g. a natural or synthetic polymer) to encapsulate particles of the cement component, set control agent (for example an alkali metal carbonate such as sodium carbonate), a gelling agent, and/or an anti-foaming agent. In some embodiments, the additive may be present in an amount from 0.02% by weight, preferably from 0.2% by weight, preferably to 10% by weight, more preferably to 5% by weight.

The term "aggregate" refers to any aggregate suitable for forming concrete which is non-reactive and which serves to reduce shrinkage and cost. For example, the aggregate may be sand or crushed limestone. A skilled person would be aware of a suitable filler, depending upon the intended used of the cement composition of the invention. In some embodiments, the weight ratio of the aggregate to the cement component is from about 1:1, for example from about 2:1 to about 6:1, for example to about 4:1, for example to about 3:1. In some embodiments, the aggregate may be a graded aggregate such that a plot of the log of particle size against percentage filler is substantially linear. An advantage of a graded aggregate is that it minimises the amount of water required to form concrete with minimal porosity. In some embodiments, the aggregate may be a graded aggregate having a particle size of from about 10 microns, for example from about 15 microns to about 30 mm, for example to about 26 mm, for example to about 12 mm. As a skilled person is aware, the particle size for an aggregate to used in shotcrete may be larger than that for gunite. Particle size may be determined using a laser particle size analyser or by sieving.

The term "sprayable" is used to indicate that the composition according to the invention is capable of being sprayed, for example using equipment generally used to spray a shotcrete or gunite cement composition. In some embodiments, the cement component and the aggregate may have a particle size suitable for application by spraying, for example a maximum particle size which is no more than about 30 mm or no more than about 25 mm or no more than about 12 mm.

In some embodiments, the step of applying the composition, in the methods of applying the composition, comprises spraying the composition, for example with a compressed fluid, for example a compressed gas such as air.

In some embodiments, the surface to which the composition is applied in the methods of applying the composition is a mine, tunnel or building structure surface.

In some embodiments, the composition according to the invention comprises water or step (ii) of the second method of the invention comprises supplying water in a water to cement solids weight ratio of from about 0.25:1, for example from about 0.4:1, for example from about 0.45 or from about 0.48 to about 0.8:1, for example to about 0.6:1, for example to about 0.55:1 or to about 0.53:1. The term "cement solids" refers to the non-aqueous contents of the composition according to the invention.

In some embodiments, the concrete according to the invention may comprise one or more structural elements. In some embodiments, the method of forming according to the invention may comprise spraying the composition onto a structural element. In some embodiments, the method of forming according to the invention may comprise forming a concrete member in a mould. In some embodiments, the method of forming according to the invention may comprise the step of placing a structural element in the mould.

The term "structural element" refers to any element which is suitable for supporting or reinforcing concrete. For example a suitable structural element may be formed from polymer or metal (for example steel).

The invention is now illustrated with reference to the following examples which are not intended to limit the scope of the invention claimed.

EXAMPLE 1

A gunite mixture was compounded from the following ingredients:

Three parts by weight of fine sand; and

One part of a commercially available hydraulic cement called Qwix available from Buzzi Unicem USA Inc.

The sand used complied with ACI 506R-05 and it was screened through a US sieve size #16. Semi quantitative XRD analysis of the hydraulic cement showed it contained about 40% of Kleins compound. Detailed XRD/XRF/ICP-OES analysis of the Qwix hydraulic cement showed it to contain (where percentages are by weight):

TABLE 1

| SampleID | Buzzi Qwix |
|---|---|
| % $SiO_2$ | 9.71 |
| % $Al_2O_3$ | 21.25 |
| % $Fe_2O_3$ | 2.48 |
| % CaO | 43.79 |
| % MgO | 0.88 |

TABLE 1-continued

| SampleID | Buzzi Qwix |
|---|---|
| % Na$_2$O | <0.01 |
| % K$_2$O | 0.27 |
| % % P$_2$O$_5$ | 0.07 |
| % TiO$_2$ | 0.53 |
| % SO$_3$ | 19.78 |
| ppm V | 17 |
| ppm Cr | 47 |
| ppm Mn | 147 |
| ppm Co | <1 |
| ppm Ni | 10 |
| ppm Cu | 5 |
| ppm Zn | 83 |
| ppm As | 56 |
| ppm Rb | 146 |
| ppm Sr | 803 |
| ppm Zr | 15 |
| ppm Mo | <1 |
| ppm Cd | 1 |
| ppm Sb | 9 |
| ppm Ba | 18 |
| ppm Pb | 35 |
| % Ash | 98.32 |
| ppm Li | 151 |
| % Free Lime | 0.32 |

The following tests were carried out using Qwix® as the cement:

TABLE 2

|  | Sand:Cement weight ratio | Water Rate (gal) | W:CM |
|---|---|---|---|
| Test #1 | 1:1 | 0.6 | 0.288 |
| Test #2 | 2:1 | 0.6 | 0.389 |
| Test #3 | 2:1 | 0.8 | 0.429 |
| Test #2 Repeat | 2:1 | 0.6 | 0.370 |
| Test #4 | 3:1 | 0.4 | 0.487 |
| Test #5 | 3:1 | 0.6 | 0.491 |
| Test #6 | 3:1 | 0.8 | 0.522 |
| Test #7 | 3:1 | 0.9 | 0.490 |
| Test #8 | 4:1 | 0.8 | 0.583 |

In Table 2, the abbreviation "W:CM" refers to a weight ratio between water and cement solids. Each test mixture was sprayed using a Reed Soya gunite machine into a test panel. ASTM procedure C1140 was followed for preparing and testing specimens from Shotcrete test panels. The test panel was constructed from ¾ inch plywood and measured 24 ins×24 ins×4 ins deep. The panel was filled to a minimum four inches depth. Cylinders having a diameter of 2 inch and a height of 4 inch cylinders were cored and extracted from the test panels as per ASTM C1604 and tested for compressive strength at 15 mins old as per ASTM C39. Compressive strengths of 6542 psi and 7032 psi were achieved. The time measured was the duration from the commencement of spraying into the box. As it took 3-4 mins to fill the box some of the core could have been just 11 mins old when tested.

EXAMPLE 2

Compositions according to the invention were prepared to measure the time to set and were compared with known formulations.

The compositions used in Example 2 are as listed in Table 3:

TABLE 3

| Cement | Initial Set (min) | Final Set (min) |
|---|---|---|
| Ordinary Portland Cement | 138 | 222 |
| CTS Rapid Set | 12 | 14 |
| Qwix (high w:cm) | 3.5 | 5.5 |
| Qwix (low w:cm) | 2.0 | 4.5 |
| China CSA (neat) | 60 | 178 |
| Hydrostone | 10 | 12 |

Qwix hydraulic cement was as detailed in Example 1. The OPC was a U.S. Type 1. CTS rapid set is a CSA cement, produced by the CTS company, containing some OPC blended in. The China CSA is a calcium sulphoaluminate cement that is produced in China and marketed as a CSA high strength material. It does not have any additional calcium sulphate added. The only sulfate in this cement is part of the Klein's compound. Hydrostone is plaster (i.e. calcium sulphate hemi-hydrate) based cement by U.S. Gypsum.

Set time data was obtained following ASTM C1398. The mix proportions were as set out in Tables 4 and 5 (where "w:c" refers to a water:cement weight ratio and "s:c" refers to a sand:cement weight ratio):

TABLE 4

| Component (g) | Qwix (high w:cm) | Qwix (low w:cm) |
|---|---|---|
| Cement | 510 | 510 |
| Sand | 1536 | 1536 |
| Water | 229.5 | 204 |
| w:c | 0.45 | 0.40 |
| s:c | 3 | 3 |

TABLE 5

| Component (g) | CTS Rapid Set | Hydrostone |
|---|---|---|
| Cement | 510 | 443 |
| Sand | 1536 | 1330 |
| Water | 204 | 111 |
| w:c | 0.40 | 0.25 |
| s:c | 3 | 3 |

The China CSA was prepared in a similar way to the CTS mix, i.e. a sand to cement weight ratio of 3 to 1 and a W:C of 0.3. Accordingly, it can be seen that the set time for the compositions according to the invention is very short.

EXAMPLE 3

In this example, the composition of the invention was used to treat damaged building structures in the form of beams.

Ten standard simply-supported beams were used after 28 days of curing. The beams were scanned and the actual position of the reinforcing steel was located and marked. All beams were damaged in pairs in different degrees by using a Kango pneumatic hammer. One damaged beam from each pair was then sprayed with a gunnite mix which was a mixture of Quickcem cement, which is a blend of China CSA cement and OPC, and sand (made by Hanson). Damaged and damaged sprayed beams were tested under 4 point bending.

The damaged beams failed within the damaged area. The damaged sprayed beams failed outside the repaired area showing that the composition according to the invention helped strengthen the damaged beam.

EXAMPLE 4

In the following example, the grading of the aggregate used in the Examples was determined by sieving and the results obtained are shown in Tables 6-9 for the different gradings of sand:

TABLE 6

| | CAER sand | | | | ACI Grading Limits | |
|---|---|---|---|---|---|---|
| | | | | | Grading No. 1 | Grading No. 2 |
| Sieve Size | Mass Retained (g) | % Retained | Cumulative Passing % | Cumulative Retained % | Cumulative Passing % | Cumulative Passing % |
| 1&½ | | 0 | 100 | 0 | 0 | 0 |
| 1 | 0 | 0 | 100 | 0 | 0 | 0 |
| ¾ | 0 | 0 | 100 | 0 | 0 | 0 |
| ½ | 0 | 0 | 100 | 0 | 0 | 100 |
| ⅜ | 12.1 | 0.4 | 99.6 | 0.4 | 100 | 90-100 |
| #4 | 67.8 | 2.3 | 97.3 | 2.7 | 95-100 | 70-85 |
| #8 | 333.9 | 11.1 | 86.2 | 13.8 | 80-98 | 50-70 |
| #16 | 429.0 | 14.3 | 71.9 | 28.1 | 50-85 | 35-55 |
| #30 | 1164.7 | 38.8 | 33.1 | 66.9 | 25-60 | 20-35 |
| #50 | 752.0 | 25.1 | 8.0 | 92.0 | 10-30 | 8-20 |
| #100 | 201.7 | 6.7 | 1.3 | 98.7 | 2-10 | 2-10 |
| #200 | 17.1 | 0.6 | 0.7 | 99.3 | | |
| Pan | 19.7 | 0.7 | 0.0 | 99.9 | | |
| | 2998.0 | 99.9 | | | | |

TABLE 7

| Mass Retained | % Retained | Cumulative Passing % |
|---|---|---|
| 12.1 | 0.4 | 99.6 |
| 67.8 | 2.3 | 97.3 |
| 333.9 | 11.1 | 86.2 |
| 429.0 | 14.3 | 71.9 |
| 1164.7 | 38.8 | 33.0 |
| 752.0 | 25.1 | 8.0 |
| 201.7 | 6.7 | 1.2 |
| 17.1 | 0.6 | 0.7 |
| 19.7 | 0.7 | 0.0 |
| 2998.0 | 100.0 | |

TABLE 8

| | | ACI Grading Limits | |
|---|---|---|---|
| Sieve Size | Sieve Size (mm) | Grading No. 1 Cumulative Passing % | Grading No. 2 Cumulative Passing % |
| 1.5 | 38.10 | 0 | 0 |
| 1 | 25.40 | 0 | 0 |
| ¾ | 19.00 | 0 | 0 |
| ½ | 12.70 | 0 | 100 |
| ⅜ | 9.51 | 100 | 95.0 |
| #4 | 4.76 | 97.5 | 77.5 |
| #8 | 2.38 | 89.0 | 60.0 |
| #16 | 1.19 | 67.5 | 45.0 |
| #30 | 0.595 | 42.5 | 27.5 |
| #50 | 0.297 | 20.0 | 14.0 |
| #100 | 0.149 | 6.0 | 6.0 |
| #200 | 0.074 | | |
| Pan | Pan | | |

TABLE 9

| Coarse #2 | Fine #1 | CAER Sand | |
|---|---|---|---|
| 100 | 100 | 100.0 | 100 |
| 100 | 100 | 99.6 | 99.6 |
| 95 | 100 | 97.3 | 97.3 |
| 80 | 98 | 86.2 | 86.2 |

TABLE 9-continued

| Coarse #2 | Fine #1 | CAER Sand | |
|---|---|---|---|
| 50 | 85 | 71.9 | 71.9 |
| 25 | 60 | 33.1 | 33.0 |
| 10 | 30 | 8.0 | 8.0 |
| 2 | 10 | 1.3 | 1.2 |
| 0 | 3 | 0.7 | 0.7 |
| | | 0.0 | 0.0 |

EXAMPLE 5

In the following example, the compressive strength of cylinders of concrete prepared according to ASTM procedure C1140 described in Example 1 was determined using Qwix cement and either coarse or fine sand as detailed in Example 4.

Table 10 shows the compressive strength of samples prepared using a sand: cement weight ratio of 2:1 with coarse cement and the indicated amount of water:

TABLE 10

| | | Compressive Strength (psi) Sample ID | | |
|---|---|---|---|---|
| | | Coarse 2:1 (0.60 gal) | Coarse 2:1 (0.82 gal) | Coarse 2:1 (1.10 gal) |
| Curing Time (hrs) | 0.25 | 5100 | 3917.5 | 1551.5 |
| | 0.5 | 5589 | 5270.5 | 2788.5 |
| | 1 | 6065 | 6479.5 | 3830 |
| | 3 | 7475.5 | 7806 | 4576 |
| | 5 | 8582.5 | 7072 | 4944.5 |
| | 6 | 7783 | 8307 | 4763 |
| | 24 | 8192 | 9222 | 6113.5 |

TABLE 10-continued

| | | Compressive Strength (psi) Sample ID | | |
|---|---|---|---|---|
| | | Coarse 2:1 (0.60 gal) | Coarse 2:1 (0.82 gal) | Coarse 2:1 (1.10 gal) |
| Curing Time (days) | 7 | | | 9829 |
| | 28 | | | 8237 |
| | 56 | | | |
| | 112 | | | |

Tables 11 and 12 show the compressive strength of samples prepared with fine cement and the indicated amount of water:

TABLE 11

| | | Compressive Strength (psi) Sample ID | | |
|---|---|---|---|---|
| | | Fine 2:1 (0.6 gal) | Fine 2:1 (0.82 gal) | Fine 1:1 (0.6 gal) |
| s:c weight ratio | | 2:1 | 2:1 | 1:1 |
| w:c weight ratio | | 0.389 | 0.429 | 0.288 |
| Curing Time (hrs) | 0.25 | 5200.5 | 3015.0 | 7174.5 |
| | 0.5 | 5487.5 | 4112 | 6937.0 |
| | 1 | 5927 | 5339.5 | 7561.0 |
| | 3 | 7915 | 6289.5 | 10039.5 |
| | 5 | 9246 | n/d | 9988.0 |
| | 6 | 9117 | 7007.5 | 9809.0 |
| | 24 | 9980.5 | 8393 | 10962.5 |
| Curing Time (days) | 7 | 9694 | | 9837.0 |
| | 28 | 9876 | | 11202.5 |
| | 56 | 10019 | | 10782.5 |
| | 112 | | | |

TABLE 12

| | | Compressive Strength (psi) Sample ID | | | |
|---|---|---|---|---|---|
| | | Fine 3:1 (0.6 gal) | Fine 4:1 (0.8 gal) | Fine 3:1 (0.8 gal) | Fine 3:1 (0.4 gal) |
| s:c weight ratio | | 3:1 | 4:1 | 3:1 | 3:1 |
| w:c weight ratio | | 0.491 | 0.583 | 0.522 | 0.487 |
| Curing Time (hrs) | 0.25 | 6787.0 | 5036.0 | 4666.0 | 6738.0 |
| | 0.5 | 7171.0 | 5328.0 | 5408.5 | 7302.5 |
| | 1 | 7331.5 | 6529.5 | 5910.5 | 7158 |
| | 3 | 9209.0 | 7235.5 | 6797.5 | 7623 |
| | 5 | 8607.5 | 7638.5 | 6629.5 | 7624 |
| | 6 | 9715.0 | 7721.5 | 7371.5 | 7818 |
| | 24 | 10577.0 | 8984.0 | 7268.5 | 10229 |
| Curing Time (days) | 7 | 8406.0 | 7020 | 9229.5 | 10310 |
| | 28 | 6795.5 | 9240 | 8345 | 9390 |
| | 56 | 11070 | 11230 | 8530 | 9240 |
| | 112 | 9900 | | | |

Tables 11 and 12 show the compressive strength of samples prepared with fine cement and the indicated amount of water:

TABLE 13

| | | Compressive Strength (psi) | |
|---|---|---|---|
| | | 13.1 | 13.2 |
| | | Sample ID | |
| | | Fine 3:1 Silica Fume (0.6 gal) | Fine 3:1 Fly Ash (0.6 gal) |
| Stabilizing agent | | Silica fume—5% by weight of cement solids | Fly ash—25% by weight of cement solids |
| s:c weight ratio | | 3:1 | 3:1 |
| w:c weight ratio | | 0.473 | 0.543 |
| Curing Time (hrs) | 0.25 | 5425.0 | 4335.0 |
| | 0.5 | 6405 | 5190 |
| | 1 | 6445 | 6235 |
| | 3 | 7875 | 7250 |
| | 5 | 8585 | 8035 |
| | 6 | 8205 | 7915 |
| | 24 | 10005 | 9435 |
| Curing Time (days) | 7 | 8925 | 8455 |
| | 28 | 10335 | 8020 |
| | 56 | 10265 | 9235 |
| | 112 | | |

EXAMPLE 6

In the following example, the effect of the accelerant, lithium carbonate was investigated in a paste study where no aggregate was used. The cure of the cement was monitored by detecting the primary ettringite peak by X-ray diffraction. Ettringite is believed to be the principal strength forming mineral.

A comparative test was run with 70 wt % of the China CSA used in Example 3, 30 wt % of anhydrite and water in a 0.3:1 water: cement weight ratio. No ettringite peak was detected during the period of the test which was 1,300 seconds, or about 20 minutes.

In a first test, 0.1 wt % $Li_2CO_3$ was added as a powder to the CSA/anhydrite mix and a clear ettringite peak was obtained within 1,300 seconds.

In a second test, $Li_2CO_3$ was dissolved in the water used to hydrate the cement in the stoichiometric proportion of the final paste and again the ettringite peak was observed at about the same time as that of the first test where $Li_2CO_3$ was used as a powder additive.

In a third test, 0.1 wt % $Li_2CO_3$ was added as a powder to Qwix cement as used in Example 1. A clear ettringite peak was obtained within 140 seconds showing that Qwix cement cures substantially instantaneously.

Accordingly, it is clear that the lithium salt could be added as an accelerant at the point of injection using a water slurry if the delivery time is less than the set time of the non-accelerated paste.

What is claimed is:

1. A gunite forming composition consisting of:
   (a) a dry cement component which consists of (i) a nucleation agent accelerant, (ii) a calcium sulphate source selected from the group consisting of beta anhydrite, gypsum and hemi-hydrate, and (iii) from 30% by weight of calcium sulphoaluminate as an ettringite forming cement, and
   (b) an aggregate, wherein
   the weight ratio of the aggregate (b) to the cement component (a) is from about 2:1 to about 6:1, and wherein
   when the composition is mixed with water, the resulting mixture has undergone final set and hardened sufficiently to possess a minimum unconfined compressive strength of 1500 psi when tested in accordance with ASTM C1140 and/or C1604 at 15 minutes after placement.

2. A composition as defined in claim 1 wherein the ettringite forming cement further consists of a mixture of a high alumina cement and calcium sulphate.

3. A composition as defined in claim 1 wherein the ettringite forming cement is present in an amount from 30% by weight to 80% by weight; the accelerant is present in an amount from about 0.01% by weight to about 5% by weight; and the calcium sulphate source is present in an amount from about 1% by weight to about 70% by weight.

4. A composition as defined in claim 1 which is sprayable.

5. A composition as defined in claim 1, wherein water when present in the composition is in a water to cement solids weight ratio of from about 0.25:1 to about 0.8:1.

6. A composition as defined in claim 1, wherein the composition has a minimum unconfined compressive strength of 5000 psi.

7. A composition as defined in claim 1, wherein the composition has a minimum unconfined compressive strength of 6000 psi.

8. A method of applying a cementitious composition to a surface which method comprises the steps of (i) providing a composition according to claim 1; and (ii) applying the composition to the surface.

9. A method as defined in claim 8 wherein the surface to which the composition is applied is a mine, tunnel or building structure surface.

10. A method as defined in claim 8 wherein the composition comprises water, wherein the water is present in the composition in a water to cement solids weight ratio of from about 0.25:1 to about 0.8:1.

11. A method of applying a cementitious composition to a surface which method comprises the steps of (i) a composition according to claim 1; (ii) mixing the composition with water; and (ii) applying the mixed composition to the surface.

12. A method as defined in claim 11 wherein the surface to which the composition is applied is a mine, tunnel or building structure surface.

13. A method as defined in claim 11 wherein step (ii) of the method comprises supplying water in a water to cement solids weight ratio of from about 0.25:1 to about 0.8:1.

14. A composition as defined in claim 1 wherein when the composition is mixed with water, the resulting mixture has undergone final set and hardened sufficiently to possess a minimum unconfined compressive strength of 1500 psi when tested in accordance with ASTM C1140 and/or C1604 at 15 minutes after placement.

* * * * *